3,142,686
PROCESS FOR PREPARING EPOXY ESTERS OF ALPHA, ALPHA-DIALKYL MONOCARBOXYLIC ACIDS
Robert W. F. Kreps, and Arie Klootwijk, Amsterdam, Netherlands, assignors to Shell Oil Company, New York, N.Y., a corporation of Delaware
No Drawing. Filed May 12, 1961, Ser. No. 109,485
Claims priority, application Netherlands May 16, 1960
5 Claims. (Cl. 260—348)

This invention relates to the production of epoxy-alkyl esters of alpha,alpha-dialkyl monocarboxylic acids and particularly to an improved method of obtaining the esters in a purified form.

It has been found that the epoxy esters defined above are suitable for preparing alkyd resins having increased stability while retaining good properties of flexibility and the like. Such alkyds are disclosed and claimed in the copending United States patent application, Serial No. 29,165, of Nantko Kloos, filed May 16, 1960. However, it has been found that such resins have a very light color even though the ester from which the resins have been prepared are colorless. Some improvement in the color of the alkyd resin made from such esters has also been obtained when the esters were prepared under substantially anhydrous conditions. Such a process is described in the copending United States application, Serial No. 67,504, of Robert W. Kreps and Arie Klootwijk, filed November 7, 1960. However, further improvement in color is considered desirable.

It has now been found, quite unexpectedly, that the desired color improvement is obtained by preparing the ester by either of the above-mentioned procedures and further purifying the ester by contacting it with a mixture of a polar organic liquid and water, and separating the ester from the aqueous solution.

Preferred polar organic liquids are those which are completely water-miscible in all ratios, such as lower alcohols and ketones. Examples of preferred polar organic liquids are monohydric alcohols such as methanol, ethanol, n-propanol and isopropanol. Very good results are obtained when the treatment is carried out with methanol and water. A relatively small quantity of methanol is required for an effective purification. If desired, the alcohol remaining behind in the purified ester may be readily removed by heating and/or by reducing the pressure. The alcohol may be recovered in a pure enough form for reuse in a simple manner by distillation from the washing liquid.

The polar organic liquid and the water may be added to the ester either separately or in combination. The mixture of epoxy alkyl ester, polar organic liquid and water stratified in two layers, one of which contains almost the entire quantity of ester and the other practically all color-forming substances. These layers may then be separated in any conventional manner. Preferably, the treatment is repeated a plurality of times.

The results of the treatment according to the invention depend on the mixing ratio of polar organic liquids to water. The higher this ratio the greater will be the effect with respect to the purity but the larger will be the quantity of ester passing into the phase containing the contaminations. However, by a suitable selection of the said ratio, it is possible to ensure a fairly high degree of purity of the ester and to limit the ester losses, i.e., the passage of the ester into the phase containing the contaminations, to not more than 1 or 2%. Suitable ratios of polar organic liquids to water are generally in the range of from 3:1 to 1:3, expressed in volumes. If desired, losses of ester may be further reduced by the addition of a water-immiscible solvent, such as xylene.

The purification may be carried out at ordinary or elevated temperature and may be accelerated by stirring or boiling under reflux.

The epoxy esters of the present invention are epoxy esters of secondary and tertiary monocarboxylic acids characterized by the presence of at least two alkyl groups linked by saturated carbon-to-carbon linkage directly to the carbon atom which is in the alpha position with respect to the carboxyl carbon atom. These epoxy esters may be represented by the empirical formula:

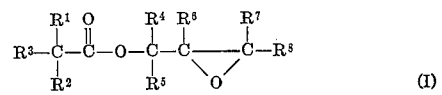

wherein $R^1$ and $R^2$ each represent the same or different alkyl radicals of normal, branched or cyclic structure, and $R^3$, $R^4$, $R^5$, $R^6$, $R^7$, $R^8$ each represent hydrogen or a hydrocarbyl radical. In the foregoing Formula I, $R^1$ and $R^2$ each may represent a member of the group consisting, for example, of methyl, ethyl, propyl, butyl, pentyl, octyl, decyl, etc., radicals. Hydrocarbyl radicals represented by $R^3$, $R^4$, $R^5$, $R^6$, $R^7$ and $R^8$ in the foregoing Formula I comprise, for example, alkyl radicals of normal, branched or cyclic structure including methyl, ethyl, propyl, butyl, pentyl, hexyl, octyl, as well as alkaryl, aralkyl, and aryl radicals. The radicals $R^4$, $R^5$, $R^6$, $R^7$ and $R^8$ may furthermore be linked in pairs outside the oxirane ring by carbon-to-carbon linkage as, for example, will be the case when $R^4$ and $R^7$ are linked to form an epoxy cyclohexyl ester. Hydrogen atoms within the above defined epoxy esters may be replaced by substituent groups such as, for example, alkoxy, amino, pyridyl, carboxyphenyl, etc. Comprised within the above-defined epoxy esters of alpha, alpha-dialkyl monocarboxylic acids as represented by Formula I, are those wherein the radicals $R^1$, $R^2$ and $R^3$ have a sum total of from 2 to about 20 carbon atoms and the epoxy hydrocarbyl group may contain from 3 to about 20 carbon atoms.

Compounds of primary importance comprised within the above defined class of epoxy esters are the epoxy-alkyl esters of alpha-alkyl alkane monocarboxylic acids, that is, those represented by the foregoing Formula I wherein $R^3$, $R^4$, $R^5$, $R^6$, $R^7$ and $R^8$ represent hydrogen or an alkyl group. Distinguished from the other members of this class because of structure and characteristics are the epoxy esters of the tertiary monocarboxylic acids defined by the foregoing Formula I when $R^1$, $R^2$ and $R^3$ are each an alkyl group, the lowest member of which is glycidyl pivalate.

The epoxy esters of alpha,alpha-dialkyl monocarboxylic acids of the present invention are obtained by reaction of an alpha,alpha-dialkyl monocarboxylic acid, for example, an alpha-alkyl alkane monocarboxylic acid, or a suitable salt thereof, with a halo-substituted monoepoxide or with a dihalo-hydrin.

The suitable alpha,alpha-dialkyl monocarboxylic acids comprise the acids represented by the general formula

wherein $R^1$, $R^2$ and $R^3$ have the same significance as indicated above in Formula I. The suitable alpha,alpha-dialkyl monocarboxylic acids comprise secondary and tertiary acids having from 4 to about 20 carbon atoms to the molecule. A preferred group comprises the acids within this class having from about 9 to about 19 carbon atoms to the molecule. Products of particular value because of their characteristics and utility are obtained when using acids of the above-defined class having from about 9 to about 11 carbon atoms to the molecule. Comprised in the suitable class of alpha,alpha-dialkyl monocarboxylic acids are, for example, pivalic acid (trimethylacetic acid), 2-methylbutanoic, isobutyric acid, isovaleric acid, 2-methylpentanoic acid, 2,4-dimethyl-valeric acid, diethylacetic acid, cyclohexane carboxylic acid, etc. A preferred class of the suitable acids comprises the alpha,alpha-dialkylalkane monocarboxylic acids and particularly the acids wherein $R^1$, $R^2$ and $R^3$ each represent an alkyl group, as in pivalic acid and its homologues. The acid charge to the process may consist of a single acid or a mixture of two or more such suitable acids. The acids may be obtained from any suitable source. A suitable method for their production comprises that disclosed and claimed in copending applications Serial Nos. 858,796 and 858,797, filed December 10, 1959, now Patent Nos. 3,059,005 and 3,059,006 respectively. Ester products of outstanding characteristics are obtained when using as the acid charge to the process, the alpha-alpha-dialkyl alkane carboxylic acids having from about 9 to about 19 carbon atoms to the molecule obtained by reacting monoolefins having 8 to 18 carbon atoms to the molecule with carbon monoxide and water in accordance with the process disclosed and claimed in said copending application Serial Nos. 858,796 and 858,797.

Halo-substituted monoepoxides reacted with the alpha, alpha-dialkyl monocarboxylic acids, or their salts, to obtain the desired esters comprise the halo-substituted monoepoxides containing a carbon atom which is directly linked to a halogen atom and to a carbon atom of an oxirane ring, that is

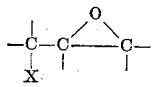

wherein $x$ represents halogen, and the valencies are satisfied by linkage to hydrocarbyl radicals. The chloroepoxy compounds are generally preferred although the use of the corresponding bromo and fluoro compounds is comprised within the scope of the invention. The halo-substituted epoxide reactants may suitably contain from 3 to about 20 carbon atoms to the molecule. A preferred reactant is 2,3-epoxypropyl chloride (epichlorohydrin). Examples of suitable halo-substituted epoxide reactants are: epibromohydrin, epifluorohydrin, 1-chloro-2,3-epoxybutane, 1-chloro-2,3-epoxyhexane, 1-chloro-2,3-epoxy-4-phenyl octane, 1-chloro-2,3-epoxy-4,5-diethyl dodecane, 3-chloro-4,5-epoxy octane, etc.

When a dihalohydrin constitutes the reactant reacted with the alpha-alpha-dialkyl monocarboxylic acid to obtain the desired esters, the suitable dihalohydrins comprise broadly the hydroxydihalo-substituted hydrocarbons containing a halogen atom linked directly to a carbon atom which is, in turn, linked directly to a carbinol carbon atom. The suitable dihalohydrins comprise the fluoro, bromo or chloro-hydrins; the chlorohydrins being generally preferred. The suitable dihalohydrins comprise the hydroxy-dichloro-substituted alkanes containing from 3 to about 20 carbon atoms and having a chlorine atom and a hydroxyl group attached to adjacent carbon atoms. Suitable hydroxy-dichloro-substituted alkanes comprise, for example, 1,3-dichlorohydrin, 1,2-dichlorohydrin, their homologues and analogues.

The epoxy esters of alpha-alpha-dialkyl monocarboxylic acids of the invention may be obtained by the interaction of the above-defined secondary and/or tertiary acids with the suitable halo-substituted monoepoxide or dihalohydrin under any conditions enabling the obtaining of a reaction mixture comprising the desired esters. Thus, they may be prepared by suspending a suitable salt of an alpha-alkyl alkane monocarboxylic acid, preferably in a finely divided solid state, in a liquid phase consisting essentially of an epoxy halo-alkane or containing an epoxy halo-alkane together with a solvent or diluent for the latter. The salts of the monocarboxylic acids used are generally the alkali metal salts, such as the sodium or potassium salts, and occasionally the alkaline earth metal salts. The quaternary ammonium salts of the alpha-alkyl alkane monocarboxylic acids are also very suitable. The epoxy halogen alkane is generally used in excess, for example, in a quantity of from about 1.05 to about 15 times the stoichiometric quantity. The suspension is heated for some time, usually some hours, with stirring. Suitable reaction temperatures comprise those in the range of from about 50° C. to about 150° C. If the epoxy halogen alkane used is epichlorohydrin, the reaction may be carried out at substantially the boiling temperature of this compound, at atmospheric pressure. Suitable catalysts comprise the tertiary amines, such as triethyl amine, triphenyl amine or tricyclohexyl amine; and the quaternary ammonium salts, such as tetramethyl ammonium chloride, tetramethyl ammonium bromide, tetrabutyl ammonium chloride, benzyl trimethyl ammonium chloride, benzyl trimethyl ammonium sulphate, cyclo-hexyl trimethyl ammonium bromide, phenyl trioctyl ammonium chloride and diphenyl dimethyl ammonium borate. It is, at times, advantageous to incorporate into the mixture a small additional quantity of an alkaline material, for example, an alkali metal hydroxide, alkali metal carbonate or calcium oxide, in addition to the salt reactant which frequently acts as an alkaline agent. The resulting esters are separated from the reaction mixture by suitable means such as filtration, distillation and/or crystallization. Then the ester is further purified by treatment with a mixture of a polar organic solvent and water, as explained above.

In one form of the process of the invention, a preferably concentrated aqueous alkali metal hydroxide solution is added gradually to a solution of the alpha-alkyl alkane monocarboxylic acid in the epoxy halo-alkane. The carboxylic acid is thereby gradually converted into the corresponding alkali metal salt which then reacts with the epoxy halo-alkane. In this case also, the water introduced into the system may be continuously removed by azeotropic distillation during the course of the process. Epoxy halo-alkane is returned to the reaction.

The novel process of preparation in which the starting materials used are aqueous solutions of salts of alpha-alkyl alkane monocarboxylic acids, has distinct advantages over other preparation techniques, particularly over those in which salts of carboxylic acids are first dried. The process as a whole is greatly simplified by omitting initial drying of the salts. Moreover, the novel process proceeds very readily in the absence of a catalyst with yields approximating theoretical. Salt formed as a by-product, for example, NaCl, is removed by a simple water washing after completion of the reaction; filtration is generally not necessary. Although the novel process proceeds in the absence of a catalyst, the use of catalysts is, however, comprised within the scope of the invention.

Production of the epoxy esters of alpha,alpha-dialkyl monocarboxylic acids by the reaction of the salt of the alpha,alpha-dialkyl monocarboxylic acid with the suitable halo-substituted monoepoxide is represented by the general reaction:

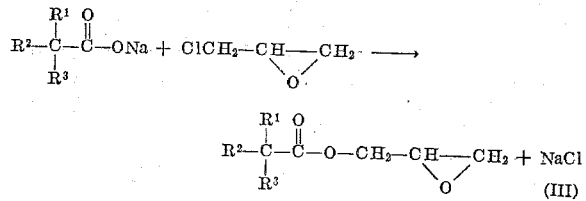

wherein the R substituents have the significance indicated above in relation to the Formula I.

When producing the epoxy esters of the alpha,alpha-dialkyl monocarboxylic acids by the reaction of alpha, alpha-dialkyl monocarboxylic acid starting material, in the form of its salt, with a suitable dihalohydrin the following reaction scheme applies:

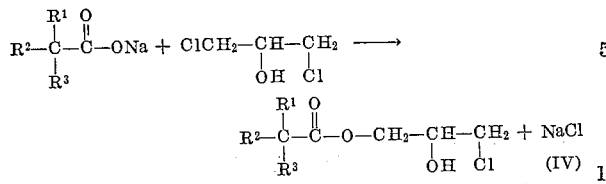

whereupon the epoxy alkyl ester is formed according to the scheme:

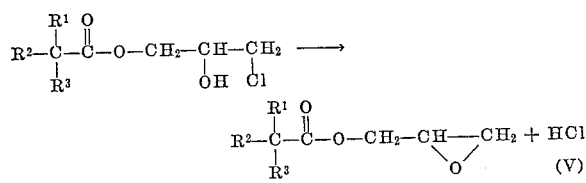

The conditions under which reaction is carried out are generally approximately the same as those suitable for reaction (III) described above.

In a second stage (reaction V) the intermediate halohydrin product so obtained is converted, by splitting off hydrogen halide, into the monocarboxylic acid epoxy alkyl ester. The splitting off is effected under the influence of a suitable base, for example, hydroxides, carbonates and bicarbonates of alkali metals; borax, oxides and hydroxides of magnesium, zinc, lead, iron and aluminum; and aluminates, silicates and zincates of alkali metals. The base is generally allowed to react with the halohydrin in the form of an aqueous solution or aqueous suspension. The base may, however, be suspended in an inert organic solvent, particularly when aluminates, silicates or zincates are used. The reaction frequently starts without supplying heat, and cooling is generally required. If water is present, the temperature is preferably not allowed to rise higher than about 50° C. When an alkali metal hydroxide is gradually added in the form of an aqueous concentrated solution, water may be removed continuously by azeotropic distillation. In this case, temperatures exceeding 50° C. may be used with advantage.

As indicated above, the epoxy alkyl esters are obtained in a substantially higher degree of purity by bringing the salt of the alpha,alpha-dialkyl monocarboxylic acid into contact with the halo-substituted monoepoxide in the form of its solution in an organic solvent and executing the reaction in the absence of any substantial amount of water.

In accordance with the above procedure, a member of the above-defined class of salts of alpha-alkane monocarboxylic acids is dissolved in a polar organic solvent under conditions resulting in a substantially anhydrous solution, and the resulting substantially anhydrous solution of the salt in the organic solvent is reacted with a member of the above-defined class of epoxy-halo alkanes in the absence of any substantial amount of water under conditions of temperature resulting in the interaction of the salt and the epoxy compound with the formation of a reaction mixture comprising an epoxy-alkyl ester of an alpha-alkane monocarboxylic acid.

By the expression "in the absence of any substantial amount of water" as used herein and in the appended claims is meant the complete absence of water, or the presence of water in only trace amounts, for example, not exceeding about 0.01 mol of water per mol of the carboxylic acid salt. The water content is preferably maintained below about 0.005 mol of water per mol of the carboxylic acid salt.

Of the above-indicated class of suitable salts of alpha-alkyl alkane monocarboxylic acids, the alkali metal and quaternary ammonium salts are particularly preferred.

The suitable organic solvents employed as solvents for the salts of the alpha-alkyl alkane monocarboxylic acid reactant in accordance with the embodiment in which the reaction is carried out under substantially anhydrous conditions comprise any of the normally liquid polar solvents for these salts which will not undergo any substantial reaction with the specific epoxy reactant used under the specific reaction conditions employed. Preferred solvents comprise, for example, the ketones such as methyl ethyl ketone, methyl isopropyl ketone, methyl isobutyl ketone, pentanone-2, pentanone-3, their homologues, etc.

The epoxy halo alkane is preferably dissolved in a suitable solvent. The solvent employed for the epoxy halo alkane reactant may optionally be the same as that used for the salt reactant. Suitable solvents for the epoxy reactant comprise, for example, normally liquid hydrocarbons, dioxane, ketones, mixtures of two or more such solvents, etc. Solvents are, however, chosen to avoid any substantial precipitation of salt reactant in the reaction zone under the specific conditions employed.

The epoxy halo-alkane and the salt of the alpha-alkyl alkane carboxylic acid, in the form of their solutions, are reacted in molar ratios assuring the substantially complete utilization of the salt reactant during the reaction. The reactants are therefore employed in substantially stoichiometrically equivalent amounts. The use of the epoxy halo-alkane in substantial molar excess over the salt reactant is somewhat preferred. Thus, the use of the epoxy halo alkane is an amount ranging, for example, from about two to about ten times the molar amount of salt reactant employed is particularly preferred.

The reaction is generally carried out in the range of from about 50 to about 180° C. The solution of the salt of the alpha-alkyl alkane monocarboxylic acid in the polar solvent is preferably added gradually to the epoxy halo alkane reactant. The invention is, however, not limited with regard to the manner in which the separate liquid reactants are brought into contact.

In one mode of preparing the ester under substantially anhydrous conditions, the salt of the alpha-alkyl alkane monocarboxylic acid may be initially in the form of a water-containing compound or in the form of an aqueous solution. The salt comprising the water associated therewith is admixed with the suitable polar solvent for the salt such as, for example, a ketone. The water is then removed from the resulting admixture. By judicious selection of the solvent the water may be removed by distillation procedures. Thus, of the suitable polar solvents one is selected which has a higher boiling temperature than water, or one which will form an azeotrope with water during distillation. The overhead from the distillation of such mixtures, comprising water and polar solvent, may after condensation be subjected to suitable conditions effecting the separation of the solvent from the water. Solvent thus recovered may be returned in part or entirety to the salt solution. Separation between solvent and water components of the distillate may at times be effected by simple stratification. When, however, separation by such relatively simple means cannot be resorted to, the separation may be effected by other suitable means. Thus, the mixed components may be separated by the addition of a third suitable component and separation effected by obtaining salting-out conditions, distillation, etc. Thus, when the water and solvent form an azeotrope, as for example when the solvent for the salt is methyl ethyl ketone, the phases may be separated by the addition of benzene or toluene as such third component.

The substantially water-free solution of the salt of the alpha-alkyl alkane monocarboxylic acid in polar solvent may be prepared by dissolving the carboxylic acid salt in a dry state in the polar solvent. The salt may be converted to a suitable dry state before incorporation into the solvent by heating in suitable conventional manner under drying conditions, as for example, on a heated mill.

The above reaction proceeds very readily in the absence of a catalyst with yields approximating theoretical. Salt formed as by product, for example, NaCl, may be removed by filtration either during the course of the reaction or upon completion of the reaction. Ester product may also be freed by by-product salt, after completion of the reaction, by water washing at substantially room temperature. Once the reaction has gone to completion, the presence of water no longer has a harmful effect and the ester is further purified by treatment with a mixture of polar organic liquid such as methanol, as described above.

In order to better illustrate the invention, the following examples are given:

Example I

A mixture of alkane having from 8 to 10 carbon atoms in the molecule (obtained as a fraction of a product formed in the thermal vapor-phase cracking of a paraffinic feedstock in the presence of steam and freed of dienes by partial hydrogenation) was converted by reaction with carbon monoxide and water into a mixture of alpha-alkyl-substituted secondary and tertiary alkane monocarboxylic acids having from 9 to 11 carbon atoms to the molecule. The conversion was effected at 60° C. with a CO pressure of 100 atm. The catalyst used contained $H_3PO_4$ and $BF_3$ in equimolar quantities. The crude mixed alpha-alkyl alkane monocarboxylic acids so obtained were neutralized with sodium hydroxide after being separated from the catalyst whereupon the resulting sodium salt solution was freed of hydrocarbons still present by extraction with gasoline. The concentration of the sodium salts in the aqueous solution was subsequently raised to 50% by weight.

To a quantity of the latter aqueous solution containing 50 parts by weight of water and 50 parts by weight of sodium salts of alpha-alkyl substituted alkane carboxylic acids of 9 to 11 carbon atoms, there was added 50 parts by weight of pentanone-2. The mixture was boiled under reflux in a flask. The pentanone-2 forms an azeotrope with water: boiling point 83° C.; composition 13.5% water and 86.5% pentanone-2. The vapor mixture was condensed, the condensate separating into two layers. One of these layers consisting substantially of water, was removed, the other consisting substantially of pentanone-2 was returned continuously to the flask. After the stage had been reached at which the condensate no longer separated into two layers an additional quantity of 100 parts by weight of pentanone-2 was gradually added to the mixture in the flask to replace the same quantity of liquid, consisting of pentanone-2 and water, which had been distilled off.

The resulting substantially anhydrous solution of the mixed sodium salts in pentanone-2 was added gradually, in the course of one hour, to 280 parts by weight of epichlorohydrin, the temperature of which was 117° C. After two hours, reckoned from the beginning of the addition of the solution to epichlorohydrin, sodium chloride was filtered off. The pentanone-2 solvent and remaining epichlorohydrin were distilled off and separated from each other. The remaining material, consisting essentially of glycidyl ester of alpha-alkyl substituted alkane carboxylic acids of 9 to 11 carbon atoms, represented a glycidyl ester yield of 99%. Epoxy group content of the product glycidyl ester was 0.420 equivalent per 100 grams.

The glycidyl ester was divided into two parts, and one part was used to prepare an alkyd resin by the procedure given below without further purification, while the other part was further purified by the process of this invention and then made into an alkyd resin.

The purification was effected by adding 58 parts of the glycidyl ester to 9 parts of methanol and subsequently 6 parts of water. The mixture was stirred for 15 minutes at a temperature of 70–75° C. The hot washing liquid was then separated from the ester. This treatment was repeated twice. The methanol dissolved in the ester was removed by distillation under reduced pressure. The yield of purified ester was 57 parts.

An alkyd resin was made from this purified ester by reacting 70 parts of ester with 31 parts of glycerol and 100 parts of phthalic anhydride. This resin had a Gardner color of 3.

An alkyd resin produced in the same way from the unpurified ester had a Gardner color of 6.

Example II

The procedure of Example I is repeated except the methanol is replaced with ethanol, similarly good results are obtained.

Example III

The starting materials were alkenes having from 8 to 10 carbon atoms in the molecule. They were obtained as a fraction of a product formed in the thermal vapor-phase cracking of a paraffinic feedstock in the presence of steam. The dienes originally present in this fraction were converted into monoolefins by partial hydrogenation. The double bonds in the alkenes were substantially present almost exclusively between non-terminal carbon atoms.

The alkenes were converted by reaction with carbon monoxide and water into alpha-alkyl-substituted secondary and tertiary alkane monocarboxylic acids having from 9 to 11 carbon atoms to the molecule. The conversion was effected at 60° C. with a CO pressure of 100 atm. The catalyst used contained $H_3PO_4$ and $BF_3$ in equimolar quantities. The crude alpha-alkyl alkane monocarboxylic acids so obtained were neutralized with sodium hydroxide after being separated from the catalyst whereupon the resulting sodium salt solution was freed of hydrocarbons still present by extraction with gasoline. The concentration of the sodium salts in the aqueous solution was subsequently raised to 50% by weight.

A quantity of the latter aqueous solution containing 2 mol of sodium salts of alpha-alkyl substituted alkane carboxylic acids of 9 to 11 carbon atoms was gradually added over a period of 2½ hours to 20 mol of epichlorohydrin; the temperature of the mixture formed being kept between 105° C. and 110° C. During the reaction, epichlorohydrin was azeotropically distilled off with water. The two liquids separated in the distillate; the epichlorohydrin was returned to the reactor. The concentration of the water in the reaction mixture was thus kept constant at about 2% by weight.

After the above period the excess of epichlorohydrin was distilled off, first at normal pressure until the bottom temperature was 160° C. and finally at a pressure of 20 mm. Hg at 120° C. The latter temperature and pressure were maintained for one hour.

The crude reaction product was cooled to 50° C. and washed three times with 150 ml. of distilled water to remove NaCl.

The resulting material, consisting essentially of glycidyl ester of alpha-alkyl substituted alkane carboxylic acids of 9 to 11 carbon atoms, was distilled in vacuo after removal of the water.

Boiling point _____ 110–122° C. at 8 mm. Hg.
Yield _____ 90 mol percent.
Epoxy group content ___ 0.420 equivalent per 100 grams.
(Theory _____ 0.424 equivalent per 100 grams.)

The ester of this purity is labeled A, and is made into an alkyd resin as indicated below. A portion of this resin is further purified by adding a mixture consisting of 9 parts of methanol and 6 parts of water to 58 parts of resin, agitating the mixture at 70–75° C. for 15 minutes and separating the hot washing liquid from the ester. This washing is repeated twice, and then the methanol remaining dissolved is the ester and is removed by distillation under reduced pressure. The ester thus purified is labeled ester B and is used to make an alkyd resin by the procedure given below.

In two comparative runs, mixtures consisting of (1) 59 grams of glycidyl ester A, 2.5 grams of glycerol, and 37 grams of phthalic anhydride, and (2) 59 grams of glycidyl ester B, 2.5 grams of glycerol, and 37 grams of phthalic anhydride are prepared. Each mixture is heated 45 minutes in a nitrogen atmosphere up to a maximum temperature of 230° C. After only this short heating period the acid number (number of mg. KOH required to neutralize 1 g.) falls to 6. In both cases, the resulting product is very light of color and of excellent quality with respect to color stability and chemical resistance. However, the resin prepared from ester B has less color or better clarity than that obtained from ester A.

We claim as our invention:

1. In a process for the preparation of epoxy esters of alpha,alpha-dialkyl monocarboxylic acids, which comprises reacting a salt selected from the group consisting of alkali metal and quaternary ammonium salts of an alpha,alpha-dialkyl monocarboxylic acid containing from 4 to 20 carbon atoms with a 1-chloro-2,3-epoxyalkane containing from 3 to 20 carbon atoms at a temperature of from about 50° C. to about 180° C. and separating the 2,3-epoxyalkyl ester of said alpha-alpha-dialky monocarboxylic acid from the reaction products; in combination, the steps of purifying said ester by intimately mixing at 70–75° C. said ester with a mixture of a monohydric alcohol which is miscible in water in all proportions and water separating the hot washing aqueous solution from the ester and removing the alcohol remaining dissolved in the ester by distillation under reduced pressure.

2. The process defined in claim 1, in which reaction for the preparation of the epoxy ester is carried out under substantially anhydrous conditions.

3. The process defined in claim 1, in which the 1-chloro-2,3-epoxyalkane is epichlorohydrin.

4. The process defined in claim 1, in which the alcohol is methanol.

5. A process for the preparation of epoxy esters of alpha,alpha-dialkyl monocarboxylic acids which comprises reacting a sodium salt of an alpha,alpha-dialkyl monocarboxylic acid containing from 9 to 11 carbon atoms with epichlorohydrin at a temperature from about 50° C. to about 180° C. and separating the 2,3-epoxyalkyl esters of said monocarboxylic acids from the reaction products; in combination, the steps of purifying said ester by intimately mixing at 70°–75° C. said ester with a mixture of methyl alcohol and water, in the range of from about 3:1 to 1:3 by volume, respectively, separating the hot washing aqueous solution from the ester and removing the methanol remaining dissolved in the ester by distillation under reduced pressure.

References Cited in the file of this patent

UNITED STATES PATENTS

| | | |
|---|---|---|
| 2,537,981 | Edwards | Jan. 16, 1951 |
| 2,556,075 | Erickson | June 5, 1951 |
| 2,852,521 | Nichols | Sept. 16, 1958 |
| 2,992,239 | Nevin et al. | July 11, 1961 |
| 3,053,855 | Maerker et al. | Sept. 11, 1962 |

FOREIGN PATENTS

| | | |
|---|---|---|
| 766,771 | Great Britain | Jan. 23, 1957 |

OTHER REFERENCES

Kester et al.: J. Org. Chem., vol. 8, pages 550–556 (1943).